United States Patent [19]

Gibson et al.

[11] 4,220,815

[45] Sep. 2, 1980

[54] NONPLANAR TRANSPARENT ELECTROGRAPHIC SENSOR

[75] Inventors: William A. Gibson, Lenoir City; John E. Talmage, Jr., Oak Ridge, both of Tenn.

[73] Assignee: Elographics, Inc., Oak Ridge, Tenn.

[21] Appl. No.: 966,351

[22] Filed: Dec. 4, 1978

[51] Int. Cl.² ............... H04N 1/00; G09B 7/00; G08B 5/36
[52] U.S. Cl. .................................... 178/18
[58] Field of Search ........... 200/86 R, 153 M, 46, 200/159; 178/18, 19, 20; 33/1 M; 340/272; 35/8, 9

[56] References Cited

U.S. PATENT DOCUMENTS

| | | | |
|---|---|---|---|
| 2,269,599 | 1/1942 | Moodey | 178/18 |
| 2,975,235 | 3/1961 | Leitner et al. | 178/18 |
| 3,005,050 | 10/1961 | Koenig, Jr. | 178/18 |
| 3,308,253 | 3/1967 | Krakinowski | 178/18 |
| 3,449,516 | 6/1969 | Cameron et al. | 178/18 |
| 3,522,664 | 8/1970 | Lambright et al. | 178/18 |
| 3,591,718 | 7/1971 | Asano et al. | 178/18 |
| 3,632,874 | 1/1972 | Malavard et al. | 178/18 |
| 3,662,105 | 5/1972 | Hurst et al. | 178/18 |
| 3,670,103 | 6/1972 | Baxter et al. | 178/18 |
| 3,673,327 | 6/1972 | Johnson et al. | 178/18 |
| 3,757,322 | 9/1973 | Barkan et al. | 178/18 |
| 3,798,370 | 3/1974 | Hurst | 178/18 |
| 3,885,097 | 5/1975 | Pobgee | 178/18 |
| 3,894,183 | 7/1975 | Barish | 178/18 |
| 3,911,215 | 10/1975 | Hurst et al. | 178/18 |
| 3,959,585 | 5/1976 | Mattes et al. | 178/18 |
| 4,071,689 | 1/1978 | Talmage et al. | 178/18 |

*Primary Examiner*—Thomas A. Robinson
*Attorney, Agent, or Firm*—Martin J. Skinner

[57] ABSTRACT

An electrographic sensor for the generation of coordinate signals corresponding to contacted positions on the sensor is described. This sensor is of particular value for placing in intimate contact with the nonplanar face of a cathode ray tube or the like. The sensor has a rigid, optically transparent substrate with a nonplanar configuration matching the nonplanar face of the CRT to reduce parallax. This normally involves a radius of curvature, in one or more directions, in a range of 15–50 inches (38–127 cm). The surface of the substrate which will not contact the CRT is coated to provide a very uniform, substantially transparent, electrically resistive layer, and electrodes are connected to the resistive layer whereby orthogonal electrical potentials may be applied to the layer. Overlying and spaced from the resistive layer is a semirigid transparent cover sheet, the face toward the resistive layer being appreciably conducting. Dispersed small areas of insulation, of minimum height, prevent contact of the resistive layer and the conducting face unless the cover sheet is depressed by an object such as a finger or stylus.

6 Claims, 4 Drawing Figures

NONPLANAR TRANSPARENT ELECTROGRAPHIC SENSOR

BACKGROUND OF THE INVENTION

The subject development relates generally to a system for data generation, interpretation, storage, transmission and the like and more particularly to a transparent electrographic sensor which may be placed over data arranged in a coordinate system. More specifically, the sensor is for placement upon the nonplanar face of a computer driven cathode ray tube or the like whereby an operator may interact with data on the tube by contacting the sensor with a finger tip, a stylus or the like.

Considerable effort has been expended in recent years toward apparatus for graphical data processing. Many of the devices developed for this purpose utilize orthogonal electrical fields in a resistive layer of the sensor and means for electrically contacting the resistive layer at some location whereby electrical output signals are derived that are proportional to the coordinates of the contact point. These signals may be in analog or digital form. The most pertinent known prior art is described in U.S. Pat. No. 3,449,516 issued to S. H. Cameron, et al.; U.S. Pat. No. 3,632,874 issued to L. C. Malavard; U.S. Pat. No. 3,798,370 issued to G. S. Hurst; U.S. Pat. No. 3,911,215 issued to G. S. Hurst, et al.; and U.S. Pat. No. 4,071,689 issued to J. E. Talmage, et al. The latter three patents have a common assignee with the present invention.

Only two of these patents (Malavard and Talmage, et al.) describe transparent sensors, i.e., sensors that may be placed over data. Both indicate potential use for placement on a cathode ray tube; however, both are flat and, in both, contact is made using a conductive probe directly upon the resistive layer. It has been recognized that for durability and convenience, and to remove the need for a stylus, a suitable cover sheet is needed. Such cover sheets take the form of a flexible layer often having a conductive layer facing the resistive layer whereby contact of the cover sheet with a probe brings about contact of the resistive layer and the conductive layer. Such construction is illustrated in the above-cited patents to Hurst and Hurst, et al. In both of these patents the cover sheet is normally maintained a small distance from the resistive layer using several forms of dispersed insulation of a type whereby the insulation is "bypassed" when pressure in appropriate form is applied to the top cover sheet. In still other patents (typically U. S. Pat. No. 2,975,235 issued to R. G. Leitner, et al.) separation is provided by tensioning the cover sheet.

When an electrographic sensor is to be used with a cathode ray tube (CRT) more exacting projection of the CRT data onto the sensor would be accomplished if the sensor was nonplanar to match the CRT face, normally a complex curvature in at least two directions. There has been no known teaching in the art, even the sensor of Talmage, et al., that a sensor could be contoured appropriately to eliminate parallax. Also, there was no teaching to provide a uniform, but small, spacing of a similarly shaped cover sheet, especially if an object such as a finger tip is to be used to contact the cover sheet (as for a "keyboard"). The tensioning method, for example, is useful only for planar surfaces and cannot be utilized for a nonplanar surface because the spacing would not be uniform. Neither is it applicable to provide the close spacing (about 0.003 in. or 0.075 mm) needed to minimize a "spongy" feeling to the contacting finger. In the case of Hurst (U.S. Pat. No. 3,798,370), the insulator net having radiating threads from each knot is visually unacceptable for a transparent sensor. The continuous gel disclosed in that same patent may not be deformed sufficiently by finger pressure to permit contact between the resistive and conductive layers. The insulation disclosed in Hurst, et al. (U.S. Pat. No. 3,911,215), was specifically intended to prevent contact of the resistive layer and the conductive layer due to finger (or hand) pressure.

Even a semirigid cover sheet of proper nonplanar configuration would not be satisfactory for most applications. When close spacing is desired, manufacturing variations, and damage induced during use, would give rise to regions of contact. Even local environmental conditions of expansion and contraction due to temperature changes, air movement, etc., would give rise to false signals.

SUMMARY OF THE INVENTION

Our invention is an improved sensor for intimate contact with a nonplanar surface containing data, such as a CRT, wherein there is a transparent substrate contoured to closely match that of the data-containing surface. The exposed face of the substrate has a uniform transparent resistive layer deposited thereon, and means are provided to connect electrical voltages to the resistive layer to produce uniform orthogonal electrical fields in the resistive layer. A transparent cover sheet is disposed above, and spaced from, the resistive layer; the face of the cover sheet toward the resistive layer having a transparent current-carrying layer. Proper spacing of the resistive layer of the substrate and the current-carrying layer of the cover sheet is provided by discrete islands of insulation having a height less than about 0.01 in. (0.254 mm), a transverse dimension of less than about 0.02 in. (0.5 mm), and an average spacing of about 0.025 to 0.5 in. (0.625–12.7 mm).

DETAILED DESCRIPTION

Figure 1:
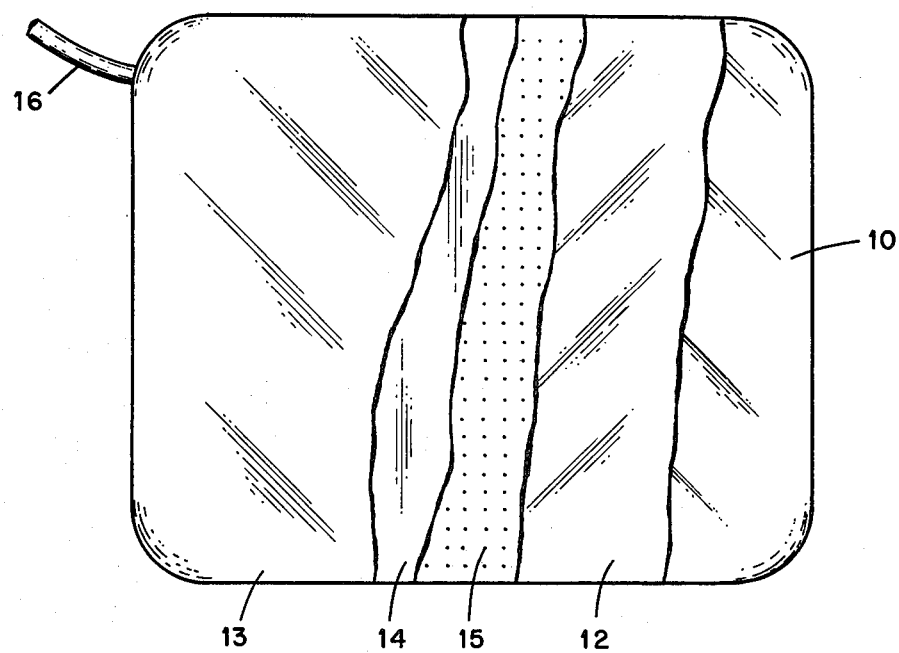
FIG. 1 is a plan view of the subject invention partially cutaway to reveal various layers.
Figure 2:
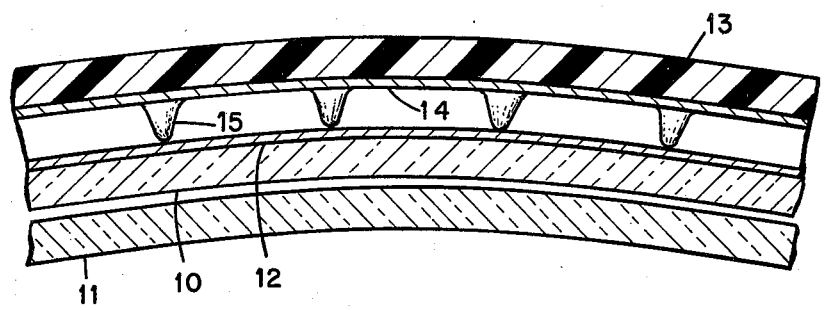
FIG. 2 is a partial sectional view of the invention showing the layers identified in FIG. 1.

The fundamental components of the present invention are illustrated in FIGS. 1 and 2. The dimensions in FIG. 2 are exaggerated to better show the components. A base element or substrate 10 is a rigid transparent member, typically glass, of uniform thickness which is contoured in all necessary directions so as to conform closely to a nonplanar data-containing unit 11. Unit 11 may be, for example, the cathode ray tube associated with data processing or the like. An upper surface of substrate 10, as referenced to unit 11, is coated with a substantially transparent resistive layer 12. As in U.S. Pat. No. 4,071,689, the resistive layer is typically a semiconducting metal oxide as represented by indium-tin oxide. Coated substrates of this type are available, for example, from Liberty Mirror, Brackenridge, Pa. This resistive layer 12 has a highly uniform resistivity which may be a selected value in the range of 10 to 10,000 ohms per square; a value in the range of 100-1000 ohms per square is preferred. Spaced a small distance from the resistive layer 12 is a transparent cover sheet 13 of moderate flexibility. Typically this is a thermoformable polyester plastic, or polyvinylchloride, having a thickness of about 0.005 in. (0.125 mm). The surface of the cover sheet facing the resistive layer is provided with a generally conductive layer 14 which also is substantially transparent. This conductive layer 14 may be, for example, a deposit of gold having a resistivity typically of about 10 to 30 ohms per square. The gold (or gold-nickel) layer is applied by conventional techniques by, for example, Evaporated Metal Films, Ithaca, N.Y.

The resistive layer 12 and the conductive layer 14 are spaced apart by small insulator islands 15. These insulators are sized and spaced to minimize separation distances between layers 12 and 14, prevent inadvertent contact therebetween and yet permit contact therebetween by a small applied pressure of a finger tip or small object. Thus, a size range for the islands is 0.001-0.01 in. (0.025-0.25 mm) in height, 0.002 to 0.02 in. (0.05-0.5 mm) across, and 0.025 to 0.50 in. (0.635-12.7 mm) apart (center to center). The larger spacing is applicable to units of least curvature of the substrate 10.

These insulator islands 15 may be composed of any suitable insulating material. One such material is ultraviolet curing ink which may be positioned using conventional silk screen or photographic techniques. A typical ink for this purpose is "Solex" distributed by Advance Excello, Chicago, Ill. The islands may be attached to the conductive layer, as shown, or to the resistive layer. Any method of application to the surfaces should be such that the islands are spaced in a substantially uniform pattern thereby assuring the desired spacing between surfaces. Other methods for producing the insulation islands are described hereinafter with reference to FIGS. 3 and 4.

Although not shown, means are required to apply orthogonal electric potentials to the resistive layer 12. Many such means are known in the art such as those of Talmage, et al., (U.S. Pat. No. 4,071,689), and of S. H. Cameron, et al., (U.S. Pat. No. 3,449,516). In general, these involve spaced-apart small electrodes attached to the resistive layer along the edges thereof and circuits connected to each electrode whereby each electrode along an edge is at substantially the same potential, and the potential is switched in orthogonal manner. The positioning of the small electrodes is such that electric field lines generated in the resistive layer, as a result of the applied potentials, project onto a planar surface so as to define a rectilinear coordinate system. the leads from electrodes (not shown) in the present development leave the sensor through cable 16.

Figure 3:
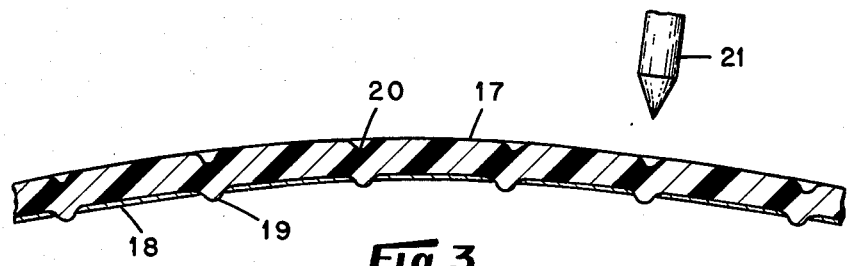
FIG. 3 is a partial sectional view illustrating one embodiment of preferred insulating spacers of the invention.

Referring now to FIG. 3, illustrated therein is a cover sheet 17 to provide the same function as cover sheet 13 of FIGS. 1 and 2. A lower surface thereof is coated with a conductive layer 18. The compositions and thicknesses may be substantially the same as discussed above. This cover sheet 17 is provided with insulator islands 19 which are integral with the cover sheet 17 and project through the conductive layer 18. Each insulating island 19 is associated with a corresponding dimple 20 in the upper surface of cover sheet 17. These dimples 20, and the insulating islands 19, are created by deforming the cover sheet 17 against a resilient surface (not shown) with a punch 21. The force exerted by the punch destroys the conductive layer at the point where the cover sheet is forced against the resilient surface. In practice, a gang-type punch or a rotary punch may be used to quickly produce a large array of insulating islands. For this forming operation the cover sheet may be flat or already formed with the proper contour. These islands then maintain the cover sheet 17 at a desired spacing distance from a resistive layer of the sensor (not shown).

Figure 4:
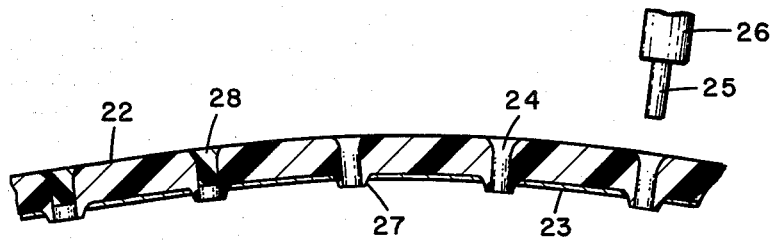
FIG. 4 is a partial sectional view illustrating another embodiment of the preferred insulating spacers.

Another embodiment of a cover sheet having integral insulating islands is illustrated in FIG. 4. As in the case of FIG. 3, a transparent cover sheet 22 (e.g., PVC) has a conductive layer 23 (e.g., Ni-Au) applied to one surface. An array of small apertures 24 are formed through both the cover sheet 22 and the conductive layer 23 using, for example, a small diameter (e.g., 0.004 in. or 0.1 mm) punch 25 supported in a holder 26. The holder 26 may be in the form of a roller, if desired. For the punching operation the cover sheet is supported on a padded surface (not shown) whereby the punch 25 fully penetrates the cover sheet 22 and conductive layer 25. In doing so, a portion of the cover sheet is extruded through the conductive layer to form the insulator islands 27, as illustrated, having a height of about 0.003 in. (0.075 mm). After punching is completed, the apertures 24 may be filled with, for example, a transparent paint (e.g., "Polane", a polyurethane paint by Sherwin Williams). This prevents moisture, dust, etc., from entering the sensor as well as exhibiting a smooth top surface for the cover sheet.

SPECIFIC EMBODIMENT

One of the more common sizes of cathode ray tubes utilized in information processing has a dimension of nineteen inches or 48.3 cm (diagonal). The surface has a radius of curvature of about thirty-two inches (81.3 cm). A glass substrate (see FIGS. 1 and 2) of 3/32 in. (2.4 mm) thickness and having a contour matching that of the cathode ray tube was coated with a resistive layer of indium-tin oxide having a resistivity of 100 ohms/square, with a uniformity of ±10%, and a transparency of about 80%. The other dimensions of the substrate were 17½ × 13¼ in. (44.5 × 33.65 cm).

Spot electrodes about ⅛ in. (3.2 mm) in diameter were placed in the corners and along each edge of the resistive layer in the form of a conductive epoxy, such as the silver-loaded epoxy manufactured by Tra-Con, Medford, Mass. Any one of several known voltageproducing circuits may be connected to these electrodes so as to produce electrical fields in the resistive layer.

Spaced above the resistive layer was a continuous cover sheet of polyvinylchloride having a thickness of 0.0075 in. (0.2 mm). A conductive layer of nickel-gold had been applied to the surface of the cover sheet facing the resistive layer. This conductive layer had a resistivity of about 100 ohms/square and a transparency of about 60%. Insulator islands integral with the cover sheet, formed as described with reference to FIG. 3, maintained a small uniform spacing between the resistive layer and the conductive layer. The insulator islands, arranged in a pattern were about 0.012 in. (0.3 mm) across, 0.003 in. (0.08 mm) high, and about 0.2 in. (5.1 mm) apart in each row. This size and spacing was sufficient to prevent contact between the conductive layer and resistive layer except when light physical pressure was applied to the cover sheet with a finger tip or an object of smaller size.

A sensor of this construction was mounted on a 19 in. (48.2 cm) CRT in an intelligent computer terminal and interfaced to the microprocessor in the terminal through suitable electronics. The microprocessor was programmed to display a multiple choice quiz in graphical chart form on the CRT. The unit was placed on public display and it was successfully used by many persons with the only instructions being to touch (with a finger) the correct answer displayed on the CRT. This example illustrates the ability of the sensor described herein to provide a convenient and simple interface between computer systems and the operator.

We claim:

1. An improved electrographic sensor for disposing upon a nonplanar data-containing surface so as to permit generation of electrical signals corresponding to x- and y-coordinates of any portion of said data, said sensor having a transparent uniformly thick substrate with a top and a bottom face, a uniform transparent resistive layer adherently deposited on said top face, and means attached to said resistive layer for connecting to electrical circuits to produce uniform orthogonal electrical fields in said resistive layer, the improvement comprising:

a. said substrate being shaped whereby said bottom face closely conforms to said nonplanar data-containing surface;

b. a transparent cover sheet supported at a substantially uniform gap distance above said resistive layer;

c. a transparent conductive layer applied to said cover sheet on a surface facing said resistive layer; and d. insulation islands having a height of from 0.0001 to 0.01 inches and a maximum transverse dimension of 0.002 to 0.02 inches uniformly distributed in said gap between said cover sheet and said resistive layer to maintain said uniform gap distance, the spacing between said insulation islands being 0.025 to 0.50 inches.

2. The sensor of claim 1 wherein said insulation islands are integral with said cover sheet.

3. The sensor of claim 1 wherein said insulation islands are attached to said conductive layer.

4. The sensor of claim 1 wherein said insulation islands are attached to said resistive layer.

5. The sensor of claim 1 wherein said insulation islands have a height of 0.002–0.003 in., a diameter of 0.010–0.016 in., and a nominal spacing of 0.2 in.

6. The sensor of claim 2 wherein said insulation islands are a result of deforming said cover sheet at selected positions, with the conductive layer against a resilient surface, with sufficient force to extrude said cover sheet through said conductive layer at said selected positions.

* * * * *

REEXAMINATION CERTIFICATE (2981th)

United States Patent [19]
Gibson et al.

[11] B1 4,220,815
[45] Certificate Issued Sep. 3, 1996

[54] NONPLANAR TRANSPARENT ELECTROGRAPHIC SENSOR

[75] Inventors: William A. Gibson, Lenoir City; John E. Talmage, Jr., Oak Ridge, both of Tenn.

[73] Assignee: Elographics, Inc., Oak Ridge, Tenn.

Reexamination Request:
No. 90/003,757, Mar. 16, 1995

Reexamination Certificate for:
Patent No.: 4,220,815
Issued: Sep. 2, 1980
Appl. No.: 966,351
Filed: Dec. 4, 1978

[51] Int. Cl.$^6$ .................................... G08C 21/00
[52] U.S. Cl. .................................... 178/18; 345/174
[58] Field of Search .................... 178/18, 19, 20; 345/173, 156, 174

[56] References Cited

U.S. PATENT DOCUMENTS

| | | | |
|---|---|---|---|
| 3,632,874 | 1/1972 | Malavard | 178/18 |
| 3,673,327 | 6/1972 | Johnson et al. | 178/18 |
| 3,699,439 | 10/1972 | Turner | 324/71 R |
| 3,894,183 | 7/1975 | Barish | 178/18 |
| 3,911,215 | 10/1975 | Hurst et al. | 178/18 |
| 4,071,691 | 1/1978 | Pepper, Jr. | 178/19 |
| 4,079,194 | 3/1978 | Kley | 178/18 |
| 4,085,302 | 4/1978 | Zenk et al. | 200/5 A |
| 4,117,068 | 9/1978 | Miller | 264/130 |
| 4,129,747 | 12/1978 | Pepper, Jr. | 178/19 |
| 4,177,354 | 12/1979 | Mathews | 345/173 X |
| 4,198,539 | 4/1980 | Pepper, Jr. | 178/18 |
| 4,293,734 | 10/1981 | Pepper, Jr. | 178/18 |
| 4,484,179 | 11/1984 | Kasday | 340/365 |

*Primary Examiner*—Wellington Chin

[57] ABSTRACT

An electrographic sensor for the generation of coordinate signals corresponding to contacted positions on the sensor is described. This sensor is of particular value for placing in intimate contact with the nonplanar face of a cathode ray tube or the like. The sensor has a rigid, optically transparent substrate with a nonplanar configuration matching the nonplanar face of the CRT to reduce parallax. This normally involves a radius of curvature, in one or more directions, in a range of 15–50 inches (38–127 cm). The surface of the substrate which will not contact the CRT is coated to provide a very uniform, substantially transparent, electrically resistive layer, and electrodes are connected to the resistive layer whereby orthogonal electrical potentials may be applied to the layer. Overlying and spaced from the resistive layer is a semirigid transparent cover sheet, the face toward the resistive layer being appreciably conducting. Dispersed small areas of insulation, of minimum height, prevent contact of the resistive layer and the conducting face unless the cover sheet is depressed by an object such as a finger or stylus.

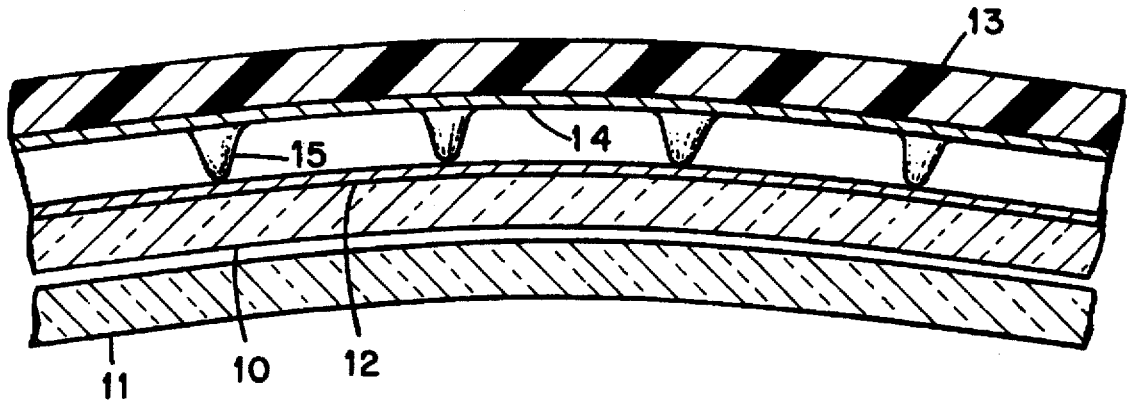

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1–6 is confirmed.

* * * * *